Patented Jan. 1, 1929.

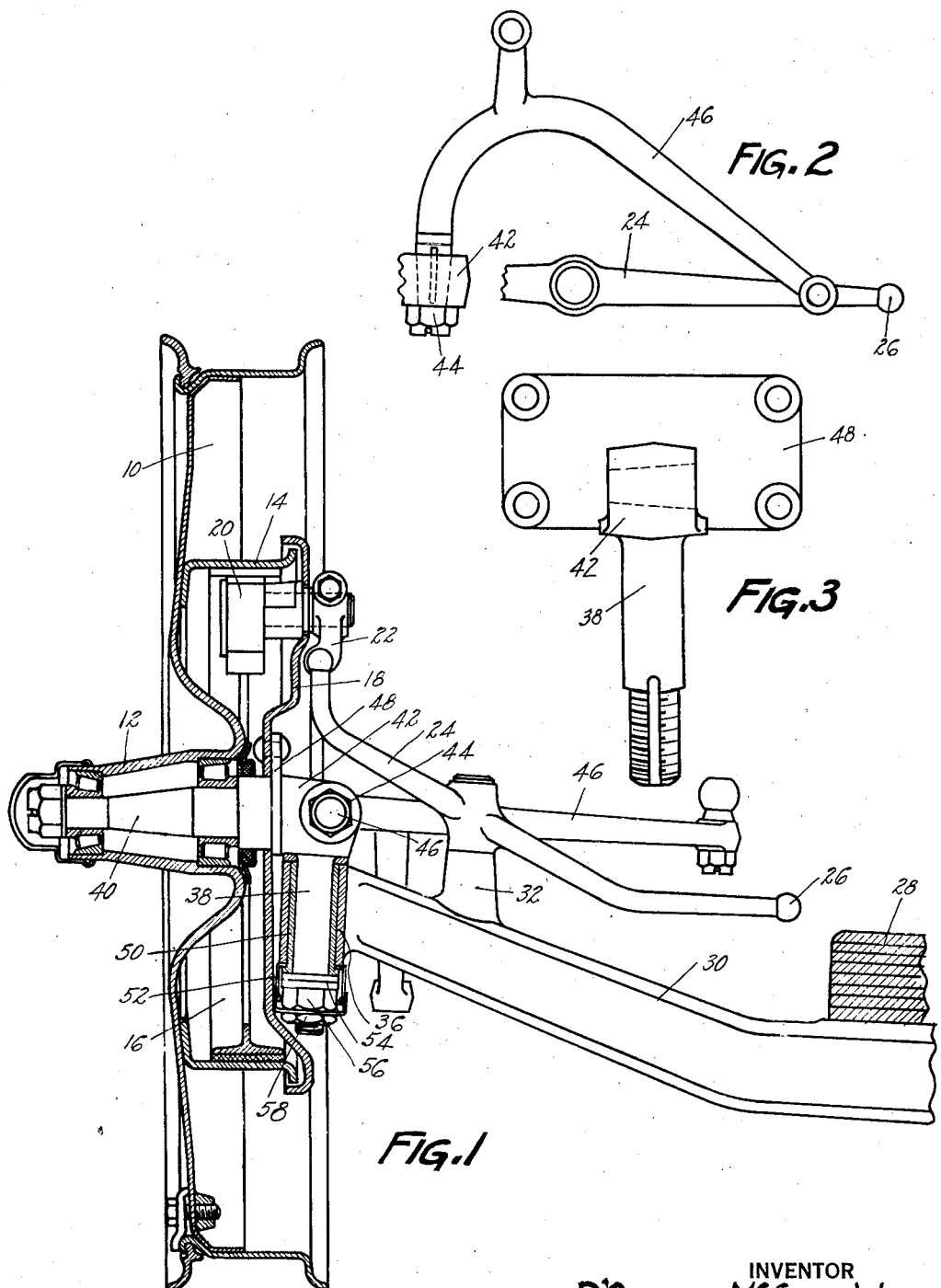

1,697,214

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

WHEEL MOUNTING.

Application filed October 1, 1925. Serial No. 59,803.

This invention relates to mountings for front or other swivelled wheels, and is illustrated as embodied in an automobile chassis. More particularly, the invention relates to improvements in a wheel mounting of the type in which the wheel spindle and king pin are integral with each other, and project at right angles from a common base, with the king pin received in a sleeve in the end of the axle.

Various features of novelty have to do with forming an integral flange on the base of the knuckle, to support a brake-backing plate and take the torque of the brake, without interfering with the king pin, and to inclosing the thrust-supporting means of the king pin in a novel lubricant-retaining housing.

These and other desirable features of the invention will be apparent from the following description of one illustrative embodiment shown in the accompanying drawing, in which:

Fig. 1 is a vertical section through one front wheel and associated parts, with the wheel knuckle in rear elevation;

Fig. 2 is a top plan view of the steering arm and the brake-operating lever; and Fig. 3 is an inside elevation of the wheel knuckle.

In the arrangement shown, the wheel includes a disk 10, of tapered section, having an integrally drawn hub 12, and carrying a drum 14 engageable by the brake shoes 16 anchored on the brake backing plate 18. Shoes 16 are applied by a cam 20 on a shaft rocked by an arm 22 having a vertical plane surface on its end engaged by the ball end of a generally horizontal brake-applying lever 24. Lever 24 has its driver-operated end 26 substantially at the upper edge of the spring 28 through which axle 30 supports the chassis frame, this being substantially the axis about which the axle "rolls" under braking torque, etc. Lever 24 is fulcrumed on a boss 32 on axle 30, and the joint between lever 24 and arm 22 moves in applying the brake forwardly from an idle position spaced behind the swivelling axis of the wheel to an active position substantially in that axis. Except as further described below, the above-listed parts or their equivalents may be of any desired construction.

At the end of axle 30 is formed a sleeve 36, in which is arranged a king pin 38 forming an integral part of a novel wheel knuckle having also an integral wheel spindle 40 at right angles to king pin 38, the spindle and king pin projecting from a common base 42, in which a nut 44 clamps the conical end of a steering arm 46.

Except on the lower, or king pin, side the base 42 of the knuckle is formed with a relatively heavy integral flange 48 to which the brake backing plate 18 is riveted or otherwise secured, and which takes the braking torque from the backing plate.

Between king pin 38 and sleeve 36 is arranged a bushing 50, having at its lower end a flange clamping against the end face of sleeve 36 the top flange of a stamped lubricant-retaining housing 52, this top flange being arranged between the bushing flange and the bottom end face of sleeve 36. Housing 52 incloses a suitable anti-friction bearing, or thrust washers, or other thrust bearing 54 held by a nut 56 threaded on king pin 38. A second nut 58 serves the double purpose of a locknut and to hold the cover of housing 52.

While one illustrative embodiment has been described in detail, it is not my intention to limit the scope of the invention to that particular embodiment, or otherwise than by the terms of the appended claim.

I claim:

A mounting for a swivelled front wheel of a vehicle comprising an axle having an end socket, a bushing therein having an outwardly turned end flange below the socket, a king pin mounted within said bushing and extending therethrough, a thrust bearing and a retaining nut on the king pin below the bushing, a housing enclosing said thrust bearing and retaining nut and comprising an upper portion having an inwardly turned flange received between the end of the socket and the flange on the bushing to be supported thereby and a lower portion mounted upon the king pin and telescoped over the upper portion to close the end thereof, and a retaining nut on the king pin holding said lower portion in place.

In testimony whereof, I have hereunto signed my name.

D'ORSAY McCALL WHITE.